(12) United States Patent
Dasgupta et al.

(10) Patent No.: US 12,530,309 B2
(45) Date of Patent: Jan. 20, 2026

(54) HETEROGENEOUS COMPUTE PLATFORM ARCHITECTURE FOR EFFICIENT HOSTING OF NETWORK FUNCTIONS

(71) Applicant: Google LLC, Mountain View, CA (US)

(72) Inventors: Santanu Dasgupta, Fremont, CA (US); Bok Knun Randolph Chung, Los Altos, CA (US); Ankur Jain, Mountain View, CA (US); Prashant Chandra, San Jose, CA (US); Bor Chan, Fremont, CA (US); Durgaprasad V. Ayyadevara, San Ramon, CA (US); Ian Kenneth Coolidge, San Diego, CA (US); Muzammil Mueen Butt, Lynnwood, WA (US)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 18/213,028

(22) Filed: Jun. 22, 2023

(65) Prior Publication Data

US 2023/0418775 A1 Dec. 28, 2023

Related U.S. Application Data

(60) Provisional application No. 63/355,848, filed on Jun. 27, 2022.

(51) Int. Cl.
*G06F 13/38* (2006.01)
*G06F 13/28* (2006.01)

(52) U.S. Cl.
CPC ............ *G06F 13/385* (2013.01); *G06F 13/28* (2013.01); *G06F 2213/0026* (2013.01); *G06F 2213/0038* (2013.01); *G06F 2213/3808* (2013.01)

(58) Field of Classification Search
None
See application file for complete search history.

(56) References Cited

U.S. PATENT DOCUMENTS

| | | | |
|---|---|---|---|
| 10,929,331 B1* | 2/2021 | Camarota | G06F 13/20 |
| 2001/0052793 A1* | 12/2001 | Nakaya | H03K 19/17736 |
| | | | 326/41 |
| 2016/0217077 A1* | 7/2016 | Ambroladze | G06F 12/0855 |
| 2021/0117249 A1* | 4/2021 | Doshi | H04L 67/1001 |
| 2022/0086226 A1* | 3/2022 | Jain | G06F 13/105 |
| 2022/0113911 A1 | 4/2022 | Kuriata et al. | |
| 2022/0198117 A1* | 6/2022 | Raumann | G06F 9/5011 |
| 2022/0335563 A1* | 10/2022 | Elzur | G06T 1/20 |

OTHER PUBLICATIONS

International Search Report and Written Opinion for International Application No. PCT/US2023/025934 dated Oct. 10, 2023. 13 pages.

* cited by examiner

*Primary Examiner* — Michael Sun
(74) *Attorney, Agent, or Firm* — Lerner David LLP (57) ABSTRACT

The present disclosure provides for a converged compute platform architecture, including a first infrastructure processing unit (IPU)-only configuration and a second configuration wherein the IPU is coupled to a central processing unit, such as an x86 processor. Connectivity between the two configurations may be accomplished with a PCIe switch, or the two configurations may communicate through remote direct memory access (RDMA) techniques. Both configurations may use ML acceleration through a single converged architecture.

20 Claims, 10 Drawing Sheets

HETEROGENEOUS COMPUTE PLATFORM ARCHITECTURE FOR EFFICIENT HOSTING OF NETWORK FUNCTIONS

CROSS-REFERENCE TO RELATED APPLICATIONS

The present application claims the benefit of the filing date of U.S. Provisional Patent Application No. 63/355,848 filed Jun. 27, 2022, the disclosure of which is hereby incorporated herein by reference.

BACKGROUND

Communication Service Providers (CSPs) worldwide are embracing disaggregation, cloud, automation and machine learning (ML)/artificial intelligence (AI) to achieve software centricity to become agile and customer experience centric. CSPs are virtualizing various network functions, deploying them on general servers, leveraging cloud native technologies across all domains of end-to-end systems architecture. An initial phase started with operations support system and business support system (OSS/BSS) that are typically deployed centrally in a CSP network, and in later phases, virtualization expanded to the core network at regional data centers or service edge of the CSP.

Traffic over the Internet is doubling almost every 2 years, and in order to maintain a proper balance between supply and demand, the computing infrastructure also needs to be doubled every 2 years. However, the density of transistors within the same sized Integrated Circuit (IC) and at the same power footprint is no longer doubling anymore, which can create an imbalance where the supply may not be able to keep up with the traffic demand anymore in a cost and power efficient manner.

BRIEF SUMMARY

The present application relates to deployment of virtualized/containerized network functions. An example relates to a virtualized distributed unit (vDU) and virtualized centralized unit (vCU) of a 4G or 5G Radio Access Network (RAN). Virtual distributed unit (vDU) and Virtual Centralized Unit (vCU) network functions of 4G/5G radio access networks (RAN) involves deployment of physical layer, scheduler, data link layer and packet processing layers including the control components of the data link. Given the involvement of lower layer components of the protocol stack, the vDU poses extremely stringent requirements for computing around high bandwidth with no packet loss, extreme low latency, predictability, reliability and security. Some of these requirements create the need for the cloud infrastructure to deliver real-time performance. Wireline access networks such as cable modem termination system (CMTS) in a cable network may have similar system requirements. To address such requirements in existing systems, vDUs and vCUs are deployed on top of x86 general purpose processors (GPP), often alongside a lookaside or inline acceleration building block (for vDU) to offload very high compute intensive processing such as the computation of forward error correction. The incoming traffic in such arrangements comes in through a dedicated network interface controller (NIC), followed by the GPP based central processing unit (CPU) processing the physical layer functions (Hi-PHY) including lookaside acceleration to process channel coding or forward error correction (FEC), followed by the GPP based CPU again that processes the scheduler and data link layer functions.

The present disclosure provides a common and horizontal telephone communication (telco) cloud infrastructure that can form the foundation for virtualization of both wireless networks, such as 4G and 5G and other radio access networks (RANs), 5G Core network (5GC) and wirelines access networks, such as cable/fiber based broadband networks. Such infrastructure can be deployed in a highly distributed manner across hundreds of thousands of sites. Such infrastructure may provide an agile, secure and efficient platform to deploy all network and information technology (IT) functions in a seamless manner. Such infrastructure may also provide higher performance and lower power consumption, while also bringing in newer capabilities to address artificial intelligence and security challenges in the new world.

A compute platform architecture described herein provides for secure and efficient deployment of CSP network functions, particularly for access networking like 4G & 5G RAN, 5G NSA (Non-Stand Alone) and SA (Stand Alone) core, cable and fiber broadband. The compute platform architecture may be modular, with a host computer as a main building block along with an optional L1 processor as a PCIe device. This architecture may include a first configuration, leveraging an infrastructure processing unit (IPU) in a headless mode without a dedicated host central processing unit (CPU). Embedded Arm CPU cores within the IPU may be implemented to deploy an operating system and network function applications. In other examples the architecture may include a second configuration, using an x86 or an Arm GPP CPU along with the IPU. Host operating system and network function application's control and management plane may be hosted on the CPU in the second configuration. Moreover, application's user plane or packet or specialized processing intensive components may be offloaded onto various peripheral accelerators.

The present disclosure provides an ability to support either an Arm based or an x86 based CPU through a common, configurable and modular platform design. It further provides an ability to support one or more accelerators in both lookaside and inline mode of operations. It further provides an ability to separate workload and infrastructure processing, and an ability to create a very lean and efficient dedicated host CPU-less design with only an infrastructure processing unit (IPU). The present disclosure provides a computing platform with optionality of x86 based CPU or Arm based CPU in a single converged architecture. Cloud infrastructure may be separated from application processing workloads leveraging x86 CPU and IPU in a single converged environment.

According to some examples, a PCIe switch may provide programmatic connectivity to achieve two configurations in a single architecture. According to other examples, remote direct memory access (RDMA) techniques may be used to achieve the single converged architecture. The first configuration may include an IPU-only configuration, wherein the IPU is connected to one or more PCIe network interface card (NIC) or accelerator devices. The second configuration may include an x86 CPU based architecture with an IPU as one unit, while connected to multiple PCIe network interface card (NIC) or accelerator devices. Both configurations may use ML acceleration through a single converged architecture.

The compute platform architecture may provide for virtualized and cloud native network functions. Such network functions may use Arm 64 bit reduced instruction set computer (RISC) based general purpose processor along with multiple special purpose accelerators and integrated NICs for hundreds of gigabytes of input/output (I/O). It further provides for energy efficient, high performance, and dense deployment of cloud service provider access network functions. The processors, accelerators, and NIC may be included in a system on chip (SoC) package.

A software-based abstraction of a L1 processor facilitates movement of network functions from one hardware construct to another. Line rate bulk encryption may be performed with Internet Protocol Security (IPsec) for hundreds of gigabytes of I/O in a SoC package to secure incoming and outgoing interfaces of cloud service provider access network functions.

The disclosure also provides for energy efficient machine learning inferencing acceleration for cloud service provider access network functions.

DETAILED DESCRIPTION

A compute platform architecture described herein provides for secure and efficient deployment of CSP network functions, particularly for access networking like 4G & 5G RAN, cable and fiber broadband. The compute platform architecture may be modular, with a host computer as a main building block along with an optional L1 processor as a PCIe device.

A first configuration of the compute platform architecture may leverage an infrastructure processing unit (IPU) in headless mode without any dedicated host CPU in the design. The IPU in the first architecture leverages its embedded Arm CPU cores for the deployment of the operating system and network function applications while offloading some application components onto the accelerators running on PCIe. The IPU also provides other embedded acceleration capabilities, such as bulk cryptography, remote direct memory access (RDMA) acceleration, packet processing offload etc. A second configuration of the compute platform architecture may add flexibility and optionality to the architecture. The second configuration includes an x86 CPU along with the infrastructure processor or IPU. The host operating system and network function application may be hosted on the CPU. Some application components may be offloaded onto the accelerators running on PCIe. The IPU may also provide additional accelerations, such as bulk cryptography, RDMA acceleration, packet processing offload, etc. Embedded Arm cores on the IPU may be leveraged to deploy infrastructure centric workloads to address storage, accelerated high speed networking, automation, lifecycle management, observability, instrumentation and many more use cases. The present disclosure provides a converged design, where a single base architecture can realize both the first and second configuration.

Figure 1:
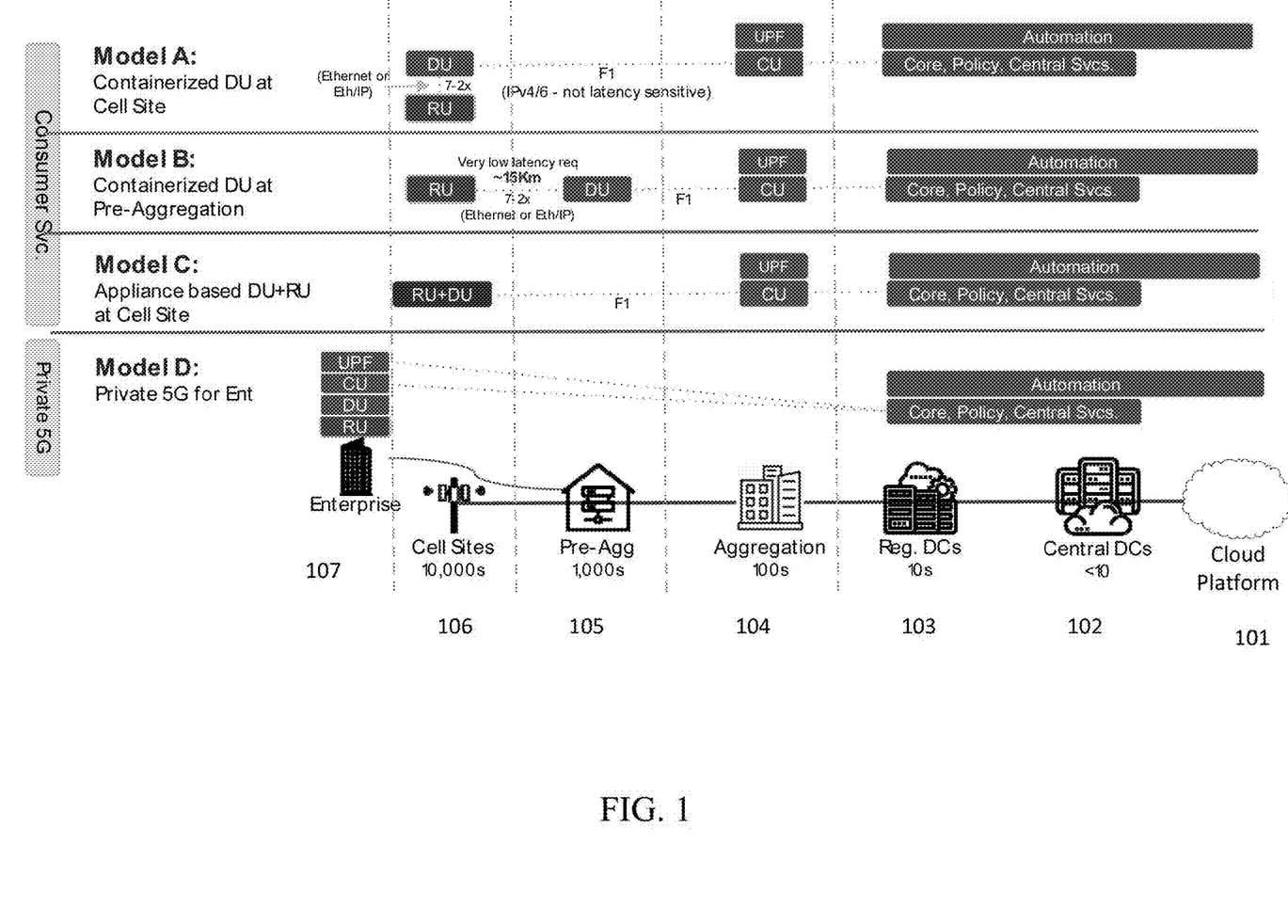
FIG. 1 is a pictorial diagram illustrating example 5G deployment models.

FIG. 1 illustrates example 5G deployment models. A cloud platform 101 supports a hierarchy of sites, including central datacenters 102, regional datacenter 103, aggregation sites 104, pre-aggregation sites 105, cell sites 106, and in some instances enterprise 107. There may be a relatively small number of central datacenters 102 and more regional datacenters 103. For example, the cloud platform 101 may support approximately 10 or fewer central datacenters 102 and tens or dozens of regional datacenters 103. Aggregation 104 may be on the order of hundreds, and pre-aggregation 105 may be on the order of thousands. By way of example only, there may be a hundred or several hundred aggregation sites 104, and a thousand or several thousand pre-aggregation sites 105. Such systems service cell sites 106, which may be on the order of tens of thousands.

In each of models A-D, automation, core, policy, and central services occur at the level of cloud platform 101, central datacenters 102, and regional datacenters 103. In each of models A-C, a user plan function (UPF) and centralized unit (CU) are at the aggregation 104. In model A, a containerized distributed unit (DU) is positioned at the cell sites 106. The cell site 106 includes a radio unit (RU), which may be used to establish radio connectivity with user devices. In model B, the DU is at the pre-aggregation 105 level. In each of models A and B, the DU is a containerized or virtualized application, while the RU is a physical appliance. In model C, the RU and DU are both physical appliances at the cell site 106 level.

In model D, private 5G is provided for enterprise 107. The enterprise 107 may be, for example, a company or organization. In this model, the UPF, CU, DU are all containerized or virtualized applications at the enterprise, and the RU is a physical appliance at the enterprise.

Figure 2:
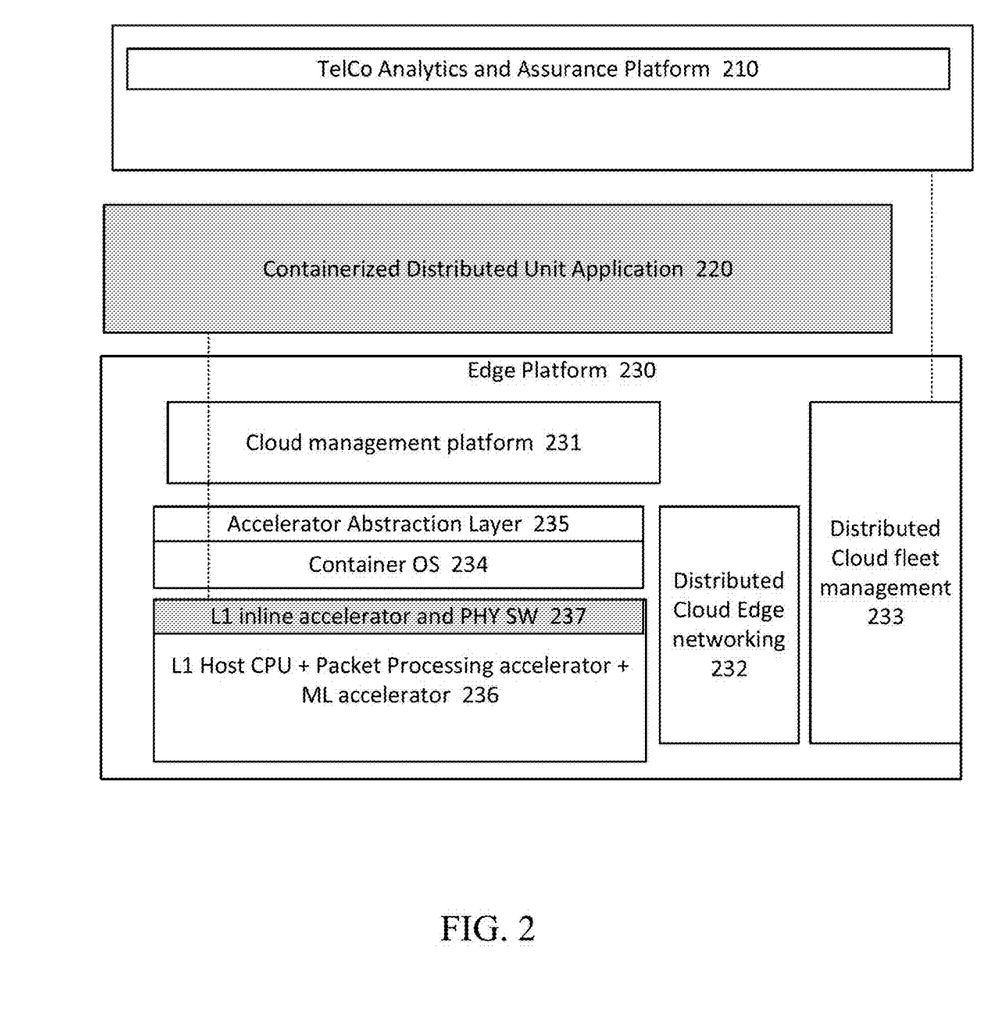
FIG. 2 is a block diagram illustrating an example framework enabling a cloud provider to service 5G models according to aspects of the disclosure.

FIG. 2 is a block diagram illustrating an example framework enabling a cloud provider to service 5G models, such as models A, B, and D discussed in connection with FIG. 1, with increased efficiency and security. The framework includes a telco analytics and assurance platform (TAAP) 210 in communication with a cloud edge platform 230. The cloud edge platform 230 may include a cloud management platform 231, a distributed cloud edge networking engine 232, and a distributed cloud fleet management engine 233. The edge platform 230 may further include a container operating system (OS) 234. An accelerator abstraction layer (AAL) 235 exists on top of the container OS 234. The AAL 235 may be controlled by the cloud platform or by a third party. The edge platform 230 may further include a host CPU unit 236, including a packet processing accelerator and a ML accelerator. An L1 physical (PHY) inline accelerator and PHY software 237 may be executed by the host CPU 236. The PHY accelerator 237 may be controlled by a third party. A containerized DU application 220 may be controlled by a third party and communicatively coupled with the host CPU 236. As one example, the containerized DU application 220 may be a RAN of an independent software vendor (ISV).

Figure 3:
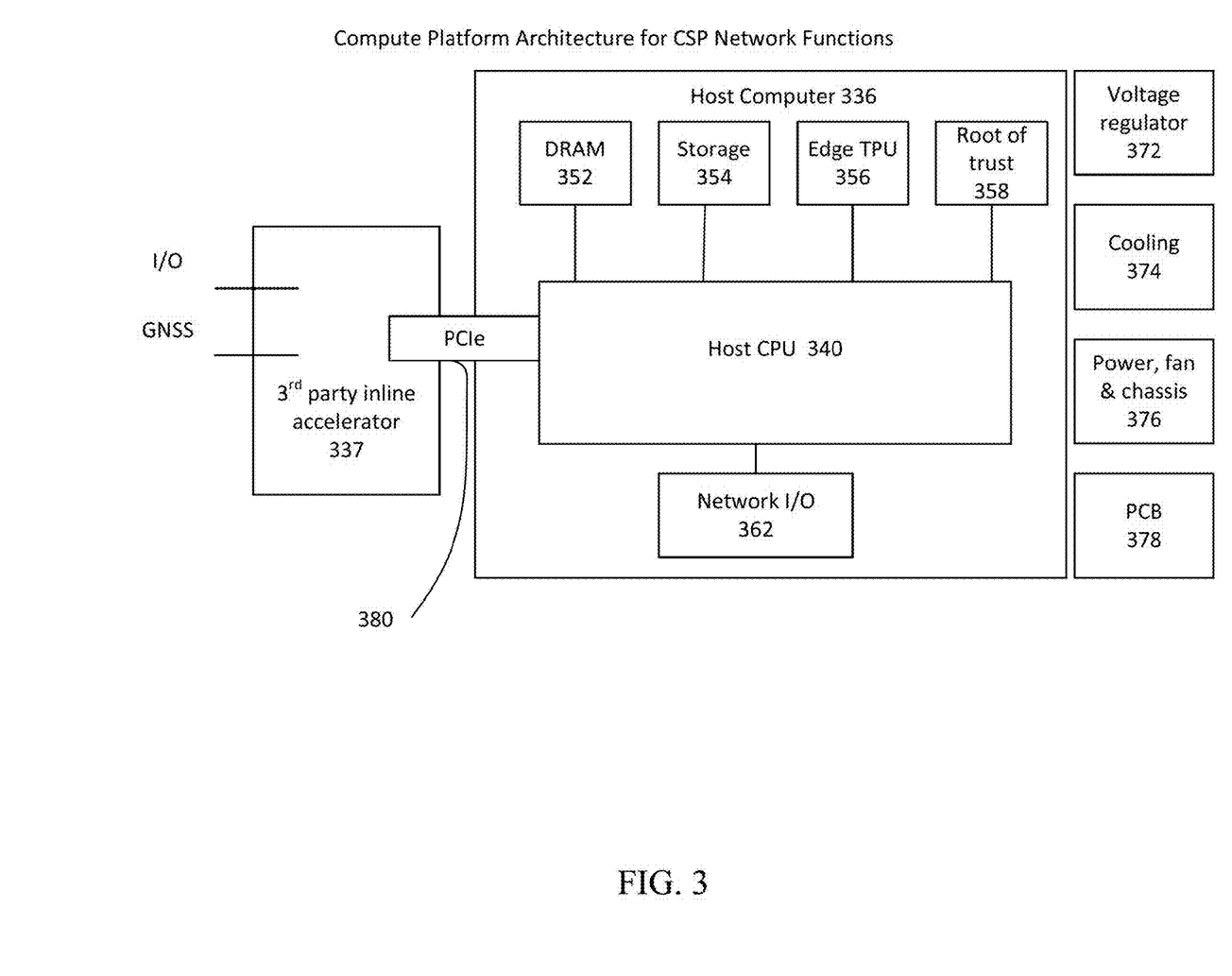
FIG. 3 is a block diagram illustrating an example cloud platform architecture for cloud service provider network functions according to aspects of the disclosure.

FIG. 3 illustrates another example cloud platform architecture for cloud service provider network functions. As shown in this example, host compute unity 336 is coupled with an inline accelerator 337 through a PCIe bus 380.

Host compute unit 336 includes host CPU 340 in communication with DRAM 352, storage 354, edge tensor processing unit (TPU) 356 or other machine learning accelerator, processor, or hardware unit, and root of trust 358. The host CPU 340 is further in communication with network I/O 362.

The host CPU 340 may be, for example, an application specific integrated circuit (ASIC) including a plurality of processing cores. By way of example, the host CPU 340 may include a NIC ASIC. The host CPU 340 may include any number of processing cores, such as 8, 16, 24, 32, 36, 48, 64, etc. According to other examples, the host CPU 340 may be any of a variety of other types of processing units, such as a graphics processing unit (GPU), a field programmable gate array (FPGA), a microprocessor, etc. The host CPU 340 can be implemented on a computing device, which itself may be part of a system of one or more devices. The host CPU 340 may include a plurality of processors that may operate in parallel.

The DRAM 352 may be any type of dynamic random access memory, such as a DDR4 memory chip or the like. According to some examples, the DRAM 352 may include multiple DRAM devices. While DRAM is illustrated in FIG. 3, in other examples other types of memory may be used. Such memory can store information accessible by the host CPU 340, including instructions executable by the host CPU 340, and data that can be retrieved, manipulated, or stored by the host CPU 340. Such memory can be a type of non-transitory computer readable medium capable of storing information accessible by the processors, such as volatile and non-volatile memory.

The instructions can include one or more instructions that when executed by the processors, causes the one or more processors to perform actions defined by the instructions. The instructions can be stored in object code format for direct processing by the processors, or in other formats including interpretable scripts or collections of independent source code modules that are interpreted on demand or compiled in advance.

The data can be retrieved, stored, or modified by the processors in accordance with instructions. The data can be stored in computer registers, in a relational or non-relational database as a table having a plurality of different fields and records, or as JSON, YAML, proto, or XML documents. The data can also be formatted in a computer-readable format such as, but not limited to, binary values, ASCII, or Unicode. Moreover, the data can include information sufficient to identify relevant information, such as numbers, descriptive text, proprietary codes, pointers, references to data stored in other memories, including other network locations, or information that is used by a function to calculate relevant data.

The storage 354 may include can include any type of non-transitory computer readable medium capable of storing information, such as a hard-drive, solid state drive, tape drive, optical storage, memory card, ROM, RAM, DVD, CD-ROM, write-capable, and read-only memories. For example, the storage 354 may include a solid state drive (SSD), hard disk drive (HDD), Non Volatile Memory Express (NVMe) etc. According to some examples, the storage 354 may include any combination of volatile and non-volatile memory.

The edge TPU 356 may be, for example, an ASIC designed to run AI at an edge of a cloud framework. According to other examples, the TPU 356 may be an FPGA, general purpose CPU, or other processing unit.

The root of trust 358 may be, for example, a hardware or software module ensuring that connected components can be trusted. For example, the root of trust 358 may be a security component that ensures devices communicating with the host compute 336 have a valid certificate.

The network input/output (I/O) 362 may include any of a variety of I.O interfaces. For example, the I/O 362 may include multiple interfaces of different types for communication with different devices.

The host compute module 336 may operate in coordination with other components of a system, such as voltage regulator 372, cooling module 374, power 376, printed circuit board (PCB) 378, etc.

The $3^{rd}$ party inline accelerator 337 may also have an I/O interface. The 3rd party inline accelerator 337 may perform digital signal processing of the physical layer function of the networking protocol stack. According to some examples, the accelerator 337 communicates with global navigation satellite system (GNSS).

Figure 4A:
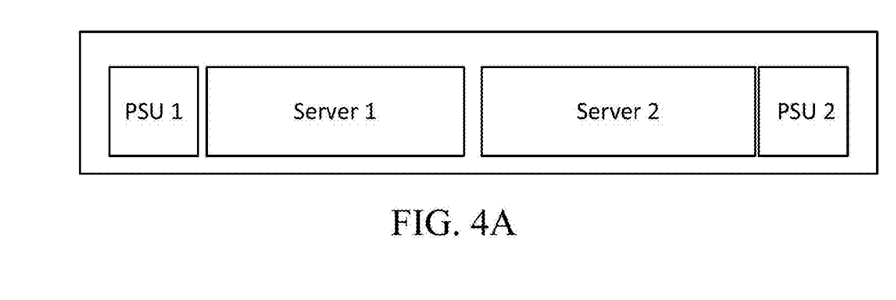
FIGS. 4A and 4B provide front and top views, respectively, of a physical implementation of the example cloud platform of FIG. 3 in a server platform in a rack according to aspects of the disclosure.
Figure 4B:
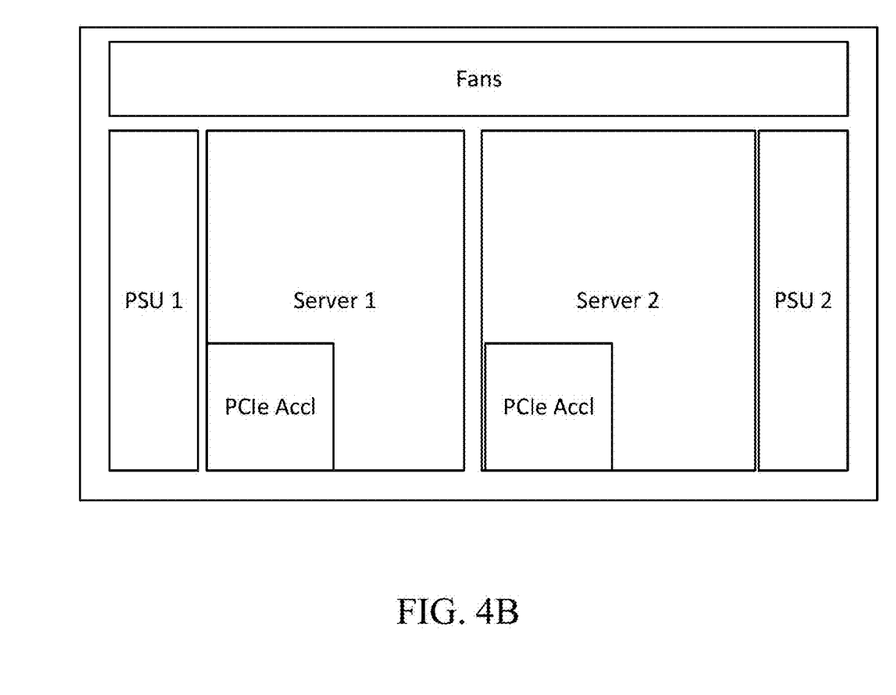

FIGS. 4A and 4B provide front and top views, respectively, of a physical implementation of a server platform in a rack. As shown, Server 1 and Server 2 are powered by respective power supply units (PSUs) positioned adjacent the respective servers in the rack. Fans are also included in the rack, providing cooling for the Servers 1 and 2. Each of Server 1 and Server 2 include a respective PCIe accelerator. The PCIe accelerator may be, for example, the inline accelerator 337 of FIG. 3. Such accelerator may be a third party component included in the servers.

Figure 5:
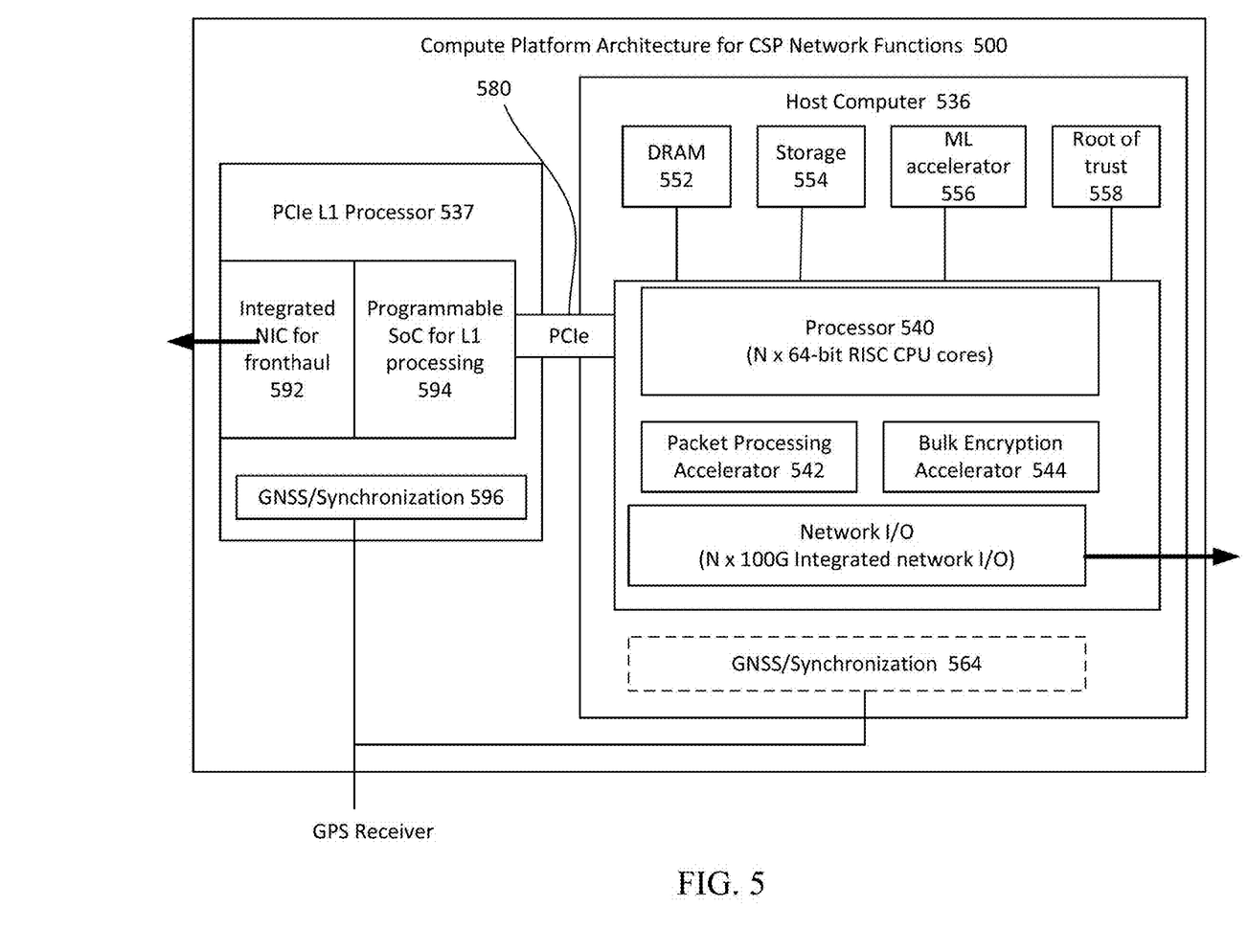
FIG. 5 is a block diagram illustrating another example compute platform architecture for CSP network functions according to aspects of the disclosure.

FIG. 5 illustrates another example compute platform architecture 500 for CSP network functions. The architecture 500 provides for secure and efficient deployment of CSP network functions, particularly for access networking like 4G & 5G RAN, cable and fiber broadband. The compute platform architecture 500 may be modular, with a host computer 536 as a main building block along with an optional L1 processor 537 as a PCIe device.

The PCIe L1 processor 537 may have an integrated network interface card (NIC) capability 592 for integrated network input/output (JO); along with a programmable, high performant and power efficient layer 1 packet and/or digital signal processor 594 that can process all functions of the physical layer so that any GPP based CPU can focus on the remaining tasks. Accessing networking functions in CSP networks can have very stringent latency and time-sensitive requirements. In order to provide high precision timing synchronization, the PCIe L1 processor can also have a synchronization building block 596 on the module with relevant silicon constructs like digital phase locked loop (DPLL), GNSS receiver etc. The PCIe L1 processor 527 may be, for example, a software based abstraction of L1 processor. Such software based abstraction may make it easy for Network Function application developers to easily port from one hardware construct to another.

The host compute module 536 is the hub of the architecture that connects itself with the optional PCIe L1 processor 537 over multiple PCIe lanes 580. Such PCIe lanes 580 may be Generation 3, 4, 5, 6, etc.

The host compute module 536 includes a processor 540. The processor 540 may be, for example, a next-generation programmable and hybrid processor. By way of example only, the processor 540 may be a combination of an energy efficient 64-bit reduced instruction set computer (RISC) based GPP CPU plus an integrated NIC with multiple hundreds of Gigabits of network I/O plus multiple special purpose packet processors. The special purpose packet processors may augment the processing to derive a great balance of flexibility, performance, power consumption, and cost.

One example of such special purpose processors include a bulk encryption accelerator 544 providing for bulk encryption of all traffic over all network I/O using IP Security (IPSEC) at multiples of 100 Gigabits of speed. Another example of the special purpose processors includes a packet processing accelerator 542 that can process headers of the traffic/user datagram. The architecture however is not limited to only these two examples and can have more capabilities in the similar lines. The bulk encryption accelerator 544 may be used, for example to encrypt/decrypt all network traffic from the system.

The host compute module 536 also includes an onboard ML accelerator 556. The ML accelerator 556 may perform inferencing at the edge along with other functions such as DRAM 552, storage 554 and hardware root of trust 558 for enhanced trust/security of the disaggregated platform. The storage 554 can be onboard or may reside on a separate physical device. The DRAM 552, storage 554, and root of trust 558 may be similar to the DRAM 352, storage 354, and root of trust 358 described above in connection with FIG. 3. An optional GNSS receiver and time sync capability 564 may also exist on the host compute module 536.

The architecture 500 may be implemented in any of a variety of forms of hardware. According to one example, the architecture 500 may be implemented as a system on chip (SoC). According to other examples, the architecture 500 may be implements in one or more servers in a rack. According to further examples, the architecture 500 may be implemented in any one or multiple computing devices.

While a number of components of the architecture 500 are illustrated, it should be understood that these are merely examples. Additional or fewer components may be included in other implementations, and components may be interchanged with other types of components. While some components are illustrated as being within a same box, such components need not reside within the same physical housing.

Figure 6:
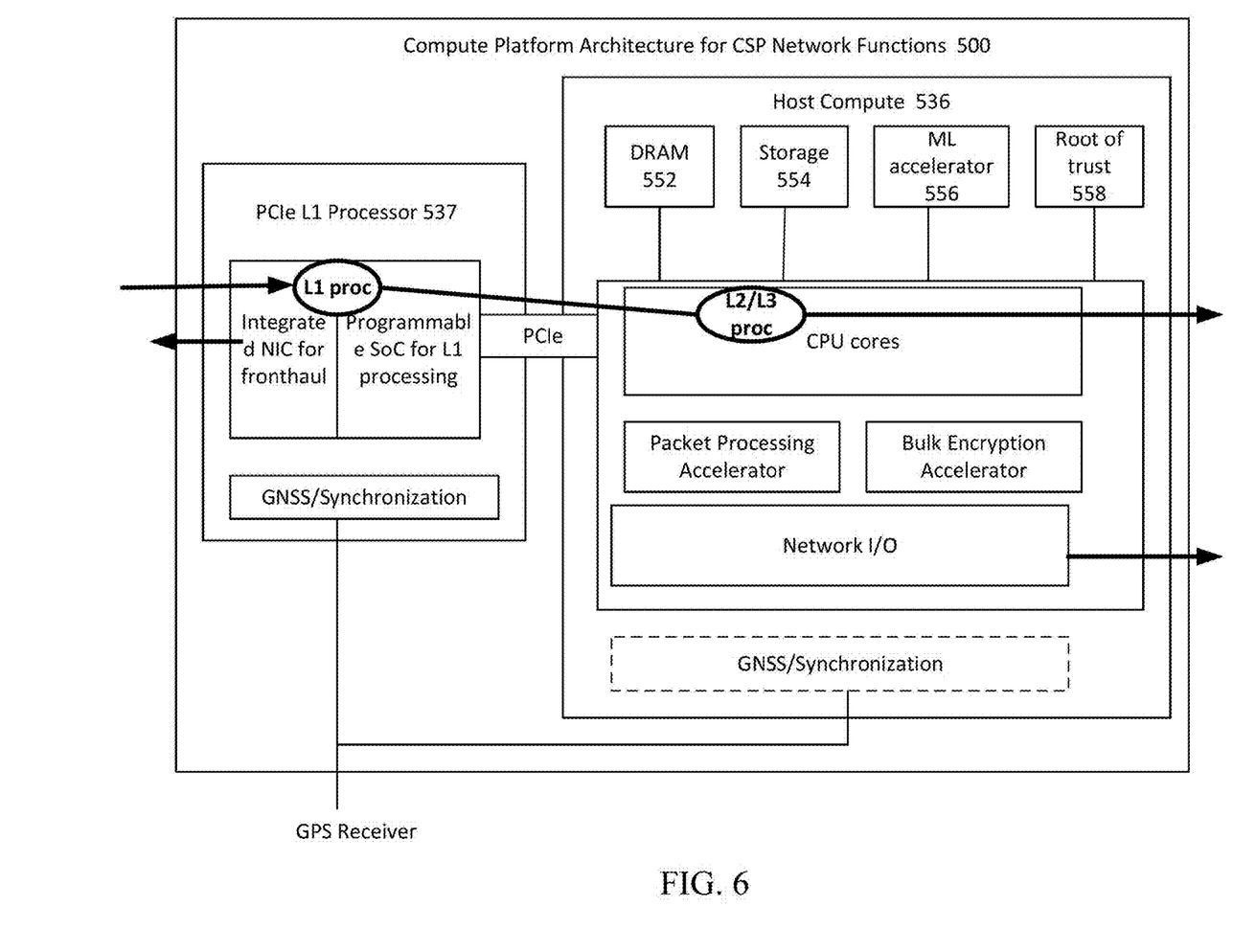
FIG. 6 illustrates an example of how processing may be performed in the architecture 500 described in connection with FIG. 5.

FIG. 6 illustrates an example of how processing may be performed in the architecture 500 described in connection with FIG. 5. As shown, L1 processing may be performed at the PCIe L1 processor 537. L2 and L3 processing may be performed at the host compute module 536.

The compute platform architecture described above may be programmed for virtualized and cloud native network functions. In some examples, such functions may utilize components in the architecture, such as a 64 bit RISC based GPP CPU along with multiple special purpose accelerators and integrated NIC for multiple 100 gigabits of I/O. CSP network access features such as DU, CU, 5GC UPF, CMTS, broadband network gateway (BNG), etc. may be densely deployed on top of the compute architecture. The architecture provides for such deployment in a highly energy efficient and high performance manner.

Special purpose processors, such as the bulk encryption accelerator, provide an ability to perform line rate bulk encryption for multi 100 Gigabit IO in a SoC package to secure all incoming and outgoing interfaces of CSP access network functions, such as DU, CU, CMTS, BNG and 4G/5G core functions like UPF or other Security Gateways. As one example, the bulk encryption can be performed with IPSEC. Energy efficient machine learning inferencing acceleration is provided for CSP access network functions like DU, CMTS, BNG when deployed alongside a RISC based GPP CPU.

The bulk encryption accelerator may be used to encrypt/decrypt all network traffic from the system. In some examples, CNF software on the system may operate with different L1/L2 accelerators with minimal modifications, through the use of a hardware abstraction layer. In further examples, a cloud based, intent-driven system securely and automatically manages the hardware and software on the computing modules.

The systems and method described above are advantageous in that they provide for increased efficiency of performance and power consumption, and efficient packaging of components. The architecture employs full inline acceleration where NIC is a bundled component of the processing complex. The system and methods also provide for increased security. For example, by adding bulk inline encryption capability using IPSEC to all incoming and outgoing traffic at very high volume, adding lookaside encryption of all control and management plane traffic using hardware accelerated SSL, and adding hardware root of trust for better integrity of the overall system (HW and SW), security is improved.

Moreover, employing machine learning at the edge enables the network to become self driving, where ML inferencing becomes ubiquitous universally across the edge of the network. Hardware abstraction enables the network function application code to be ported easily from one hardware implementation to another.

Figure 7A:
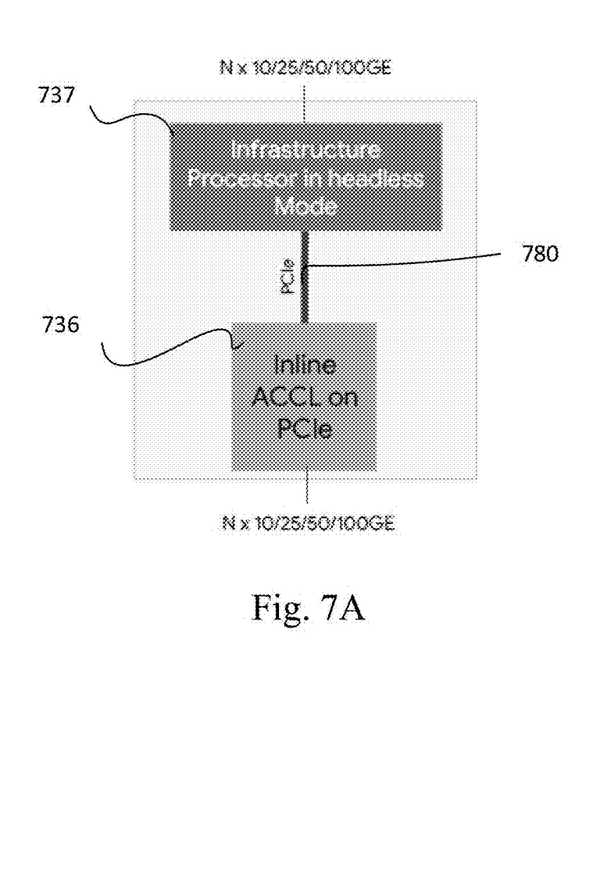
FIG. 7A is a simplified block diagram illustrating a first configuration according to aspects of the disclosure.
Figure 7B:
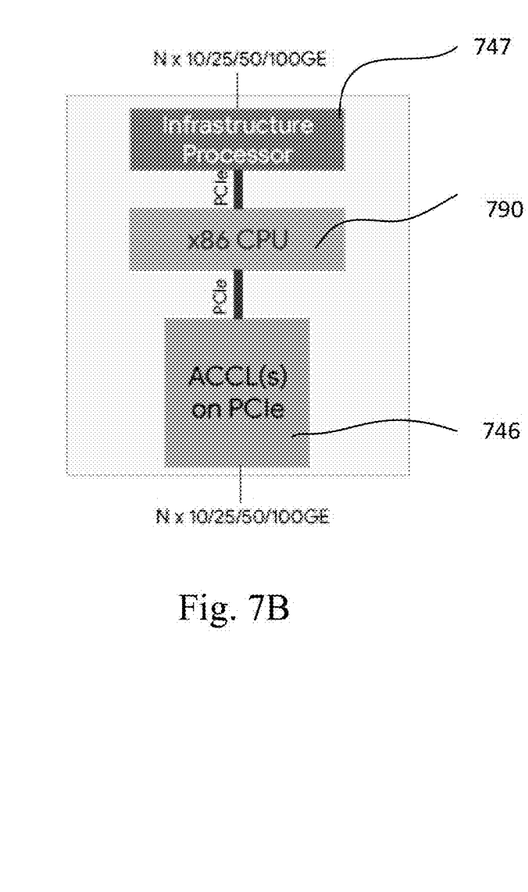
FIG. 7B is a simplified block diagram illustrating a second configuration according to aspects of the disclosure.

FIGS. 7A-7B represent first and second configurations of the compute platform architecture described above. The first configuration, illustrated in FIG. 7A, represents a simplified version of the architecture described above in FIG. 6. In this first architecture, infrastructure processing unit (IPU) 737 operates in headless mode without any dedicated host CPU in the design. The IPU 737 in the first architecture may include embedded Arm CPU cores, which it leverages for deployment of operating system and network function applications. Inline accelerators 736 run on PCIe 780. The IPU also provides other embedded acceleration capabilities, such as bulk cryptography, remote direct memory access (RDMA) acceleration, packet processing offload etc.

The second configuration, illustrated in FIG. 7B, may add flexibility and optionality to the architecture. The second configuration includes a host CPU, such as an x86 CPU 790, Arm CPU, or other CPU, along with an IPU 747. Host operating system and network function applications may be hosted on the CPU 790. Some application components may be offloaded onto accelerators 746 running on PCIe 784. The IPU 747 may also provide additional accelerations, such as bulk cryptography, RDMA acceleration, packet processing offload, etc. Embedded Arm cores on the IPU 747 may be leveraged to deploy infrastructure centric workloads to address storage, accelerated high speed networking, automation, lifecycle management, observability, instrumentation and many more use cases.

Figure 8:
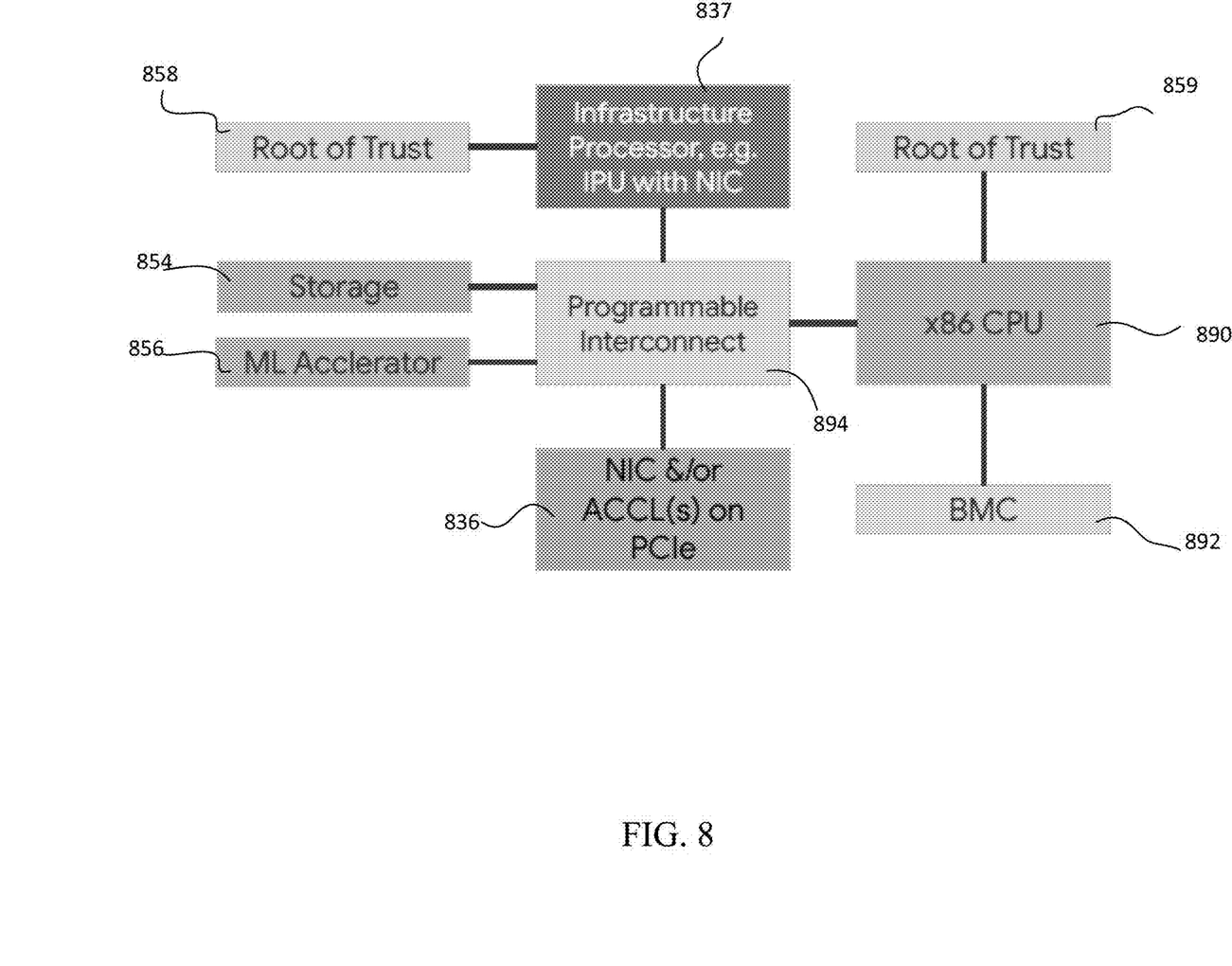
FIG. 8 is a block diagram illustrating a converged architecture for realizing both the first configuration and the second configuration, according to aspects of the disclosure.

FIG. 8 provides a converged design, where a single base architecture can realize both the first and second configuration of FIGS. 7A and 7B, respectively. As shown in FIG. 8, the converged design includes a programmable interconnect 894 coupling an IPU 837, an x86 CPU 890, and one or more PCIe devices 836, such as NICs, accelerators, etc. The programmable interconnect 894 may also provide a connection between such components and storage 854 and/or machine learning accelerators 856. The x86 CPU 890 may further be coupled with a root of trust 859 and a controller, such as a baseboard management controller 892. The IPU 837 may also be coupled with a root of trust 858. The root of trust 858 coupled with the IPU 837 may be separate from the root of trust 859 coupled with the x86 CPU 890.

The programmable interconnect 894 may be, for example, an electrically programmable interconnection providing a routing path for programmable logic blocks. The routing paths may include wire segments which may be interconnected by one or more electrically programmable switches. By way of example, the programmable interconnect 894 may be a PCIe switch, a field programmable gate array (FPGA), application specific integrated circuit (ASIC), or other device.

The x86 CPU 890 may be, for example, a complex instruction set computer or a processor executing complex instruction sets.

The baseboard management controller (BMC) 892 may be, for example, a specialized service processor that monitors a physical state of a server and associated hardware devices using sensors, and provides an interface to a system administrator to define hardware configuration and monitoring. For example, the BMC 892 may be a processor that monitors the physical state of the x86 CPU 890 and/or other devices in the architecture. The BMC 892 may detect parameters such as voltage, temperature, communication parameters, etc.

The PCIe devices 836 may include, for example, one or more NICs, one or more accelerators, and/or other PCIe devices, such as graphics processing units (GPUs) or the like.

The IPU 837 may also include a NIC. For example, the IPU may be a system-on-chip (SoC) including multiple functional components. One of such functional components may be the NIC, such as for network interfacing. As such, the IPU 837 may provide high speed Ethernet I/O connection to connect a server with external components of a network.

The root of trust 858 and root of trust 859, along with storage 854 and machine learning (ML) accelerator 856, may be similar to comparable components described above in connection with FIGS. 3, 5, 6. More detailed examples of the converged architecture of FIG. 8 are provided below in connection with FIGS. 9-10.

Figure 9:
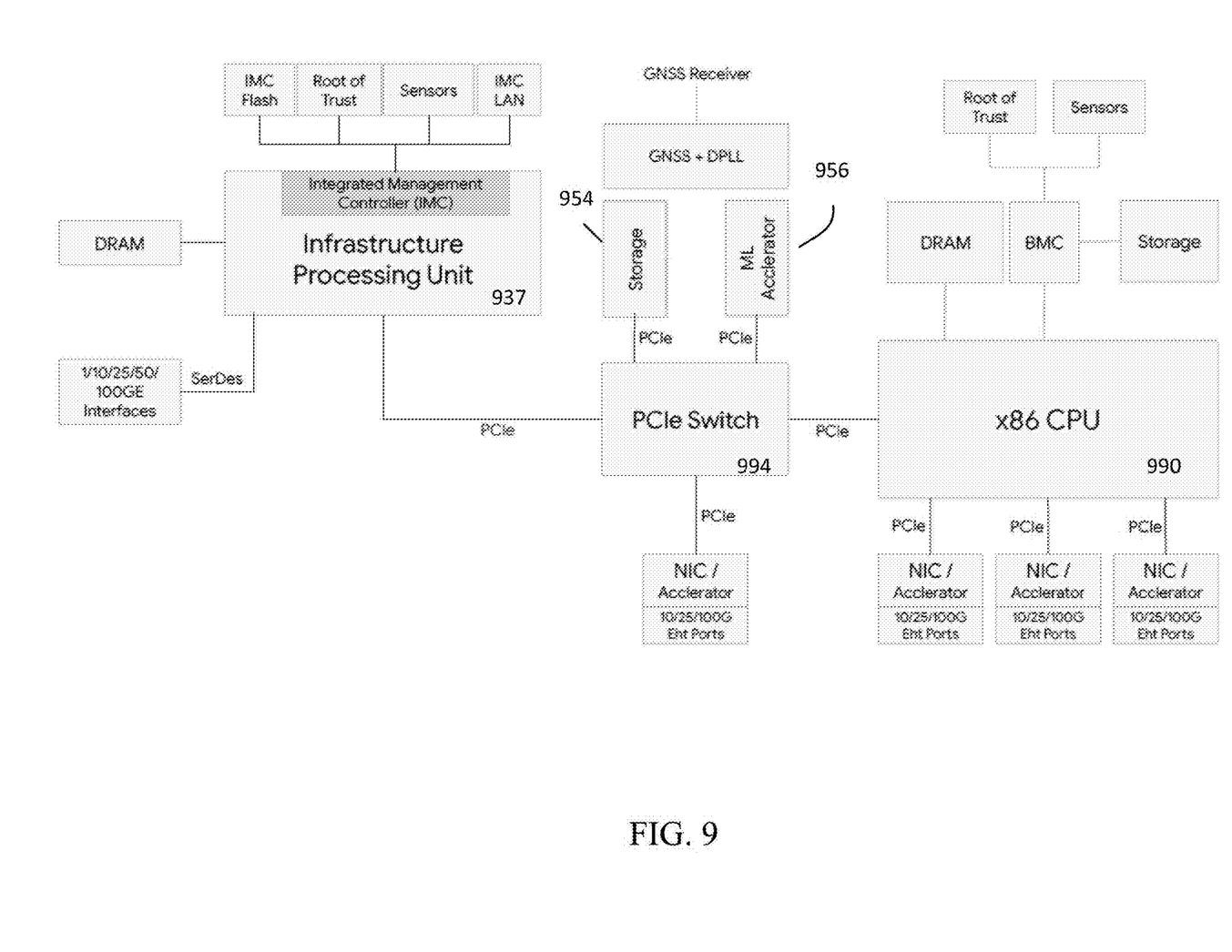
FIG. 9 is a block diagram illustrating a first example system having a converged architecture according to aspects of the disclosure.

FIG. 9 is a block diagram illustrating a first example system having a converged architecture. The first example leverages a PCIe switch to provide programmatic connections from various PCIe based NIC/accelerators to either the x86 CPU or to the IPU if the IPU is being promoted as the CPU with its embedded Arm cores. The PCIe switch similarly also provides programmatic connection of the storage for the server and ML accelerators to either the x86 CPU or to the IPU to serve the same purpose. The integrated NIC of the IPU will be leveraged in both configuration options to serve some network function or application connectivity along with integrated cryptography and packet processing acceleration.

As shown in FIG. 9, the PCIe switch 994 is directly connected to storage 954 and ML accelerator 956. It is further directly coupled to PCIe devices, such as a NIC and/or one or more accelerators. Moreover, the PCIe switch 994 establishes a connection between the IPU 937 and the x86 CPU 990. In this regard, either the IPU 937 or the x86 CPU 990 may function as a main processing unit for the system, providing flexibility and adaptability. According to some examples, both the IPU 937 and the x86 CPU 990 may be utilized, such as to share workload. Moreover, both the IPU 937 and the x86 CPU 990 may access storage 954 and ML accelerator 956 through the PCIe switch 994. The IPU 937 may additionally utilize directly connected resources of memory, root of trust, sensors, local area network, etc., such as discussed above in connection with FIGS. 3, 5, 6. The x86 CPU 990 may similarly access directly connected resources, such as memory, root of trust, sensors, controllers, etc. Additionally, the x86 CPU 990 may be directly couple with one or more PCIe devices, such as one or more NICs, accelerators, or the like.

Figure 10:
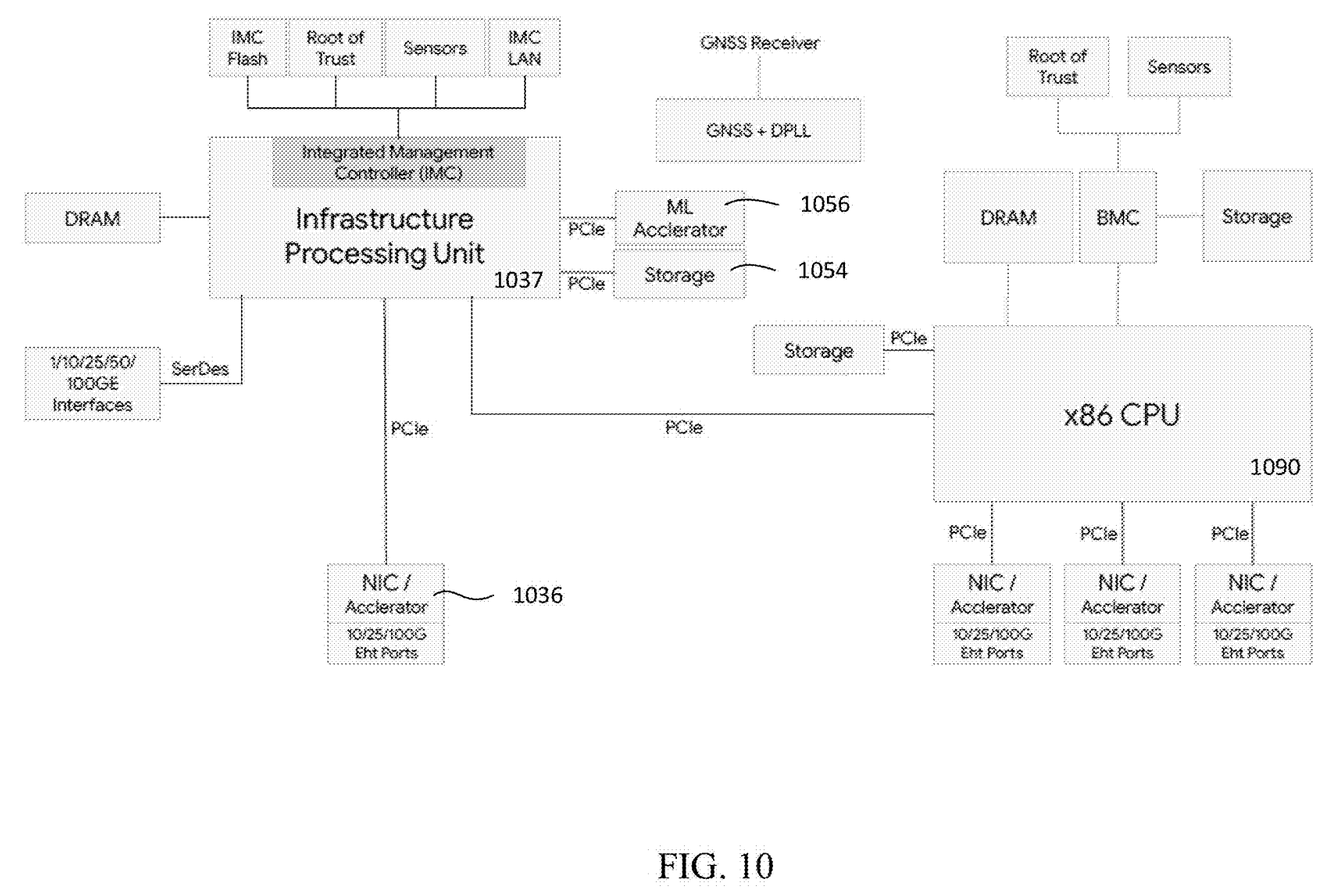
FIG. 10 is a block diagram illustrating a second example system having a converged architecture according to aspects of the disclosure.

FIG. 10 is a block diagram illustrating a second example system having a converged architecture according. The second example relies on the principle of RDMA to avoid the usage of a PCIe switch. Elimination of the PCIe switch reduces both cost and power consumption of the overall system, as compared to the first example system of FIG. 9. As shown in FIG. 10, at least one NIC/Accelerator 1036 connects to IPU 1037 directly. ML Accelerator 1056 and storage 1054 also directly connect to the IPU 1037. The IPU 1037 may provide the x86 CPU 1090 with access to both the NIC/accelerator 1036 and the ML accelerator 1056 when using an x86 CPU based configuration. For example, the IPU may provide such access via remote direct memory access (RDMA). The x86 CPU 1090 may also have additional NIC/accelerator devices directly connected to it. In the absence of the x86 CPU 1090, the IPU 1037 may be promoted to the CPU itself with its Arm cores. As such, the IPU 1037 and its directly connected NIC/accelerator 1036 and ML accelerator 1056 will produce the first configuration, such as the simplified first configuration of FIG. 7A above.

While the examples above describe an IPU, in other examples the IPU may be omnibus CPU cores. The omnibus CPU cores may include an integrated NIC for network I/O and fixed function activators. The fixed function activators may provide for functions such as cryptography, RDMA acceleration, offloading packet processing, etc.

As described above, a common, configurable and modular platform design supports either an Arm based or an x86 based CPU. It further supports one or more accelerators in both lookaside and inline mode of operations. In lookaside mode, the accelerator is off-path to traffic. The processing unit handles baseline processing, and offloads other functions to an adjacent accelerators. The adjacent accelerators perform a job and return the result to the processing unit. With inline mode of operation, the accelerator is in-path to the traffic and typically performs the entire processing for functions, leaving the processing unit completely free for those specific functions.

The platform design further provides an ability to separate workload and infrastructure processing, and an ability to create a very lean and efficient CPU-less design with only an IPU. The computing platform described herein provides optionality of x86 based CPU or Arm based CPU in a single converged architecture. Cloud infrastructure may be separated from application processing workloads leveraging x86 CPU and IPU in a single converged environment. For example, each converged system may be implemented on a server that is part of the cloud infrastructure. Each converged system includes two types of processing blocks, such as the IPU processing block and the x86 CPU processing block. Application processing workloads, such as customer workloads, may be executed on one processing block, such as the x86 CPU. Meanwhile, infrastructure applications may be executed on the IPU.

According to some examples, a PCIe switch may provide programmatic connectivity to achieve two configurations in a single architecture. According to other examples, remote direct memory access (RDMA) techniques may be used to achieve the single converged architecture. The first configuration may include an IPU-only configuration, wherein the IPU is connected to one or more PCIe network interface card (NIC) or accelerator devices. The second configuration may include an x86 CPU based architecture with an IPU as one unit, while connected to multiple PCIe network interface card (NIC) or accelerator devices. Both configurations may use ML acceleration through a single converged architecture.

The compute platform architecture may provide for virtualized and cloud native network functions. Such network functions may use Arm 64 bit reduced instruction set computer (RISC) based general purpose processor along with multiple special purpose accelerators and integrated NICs for hundreds of gigabytes of input/output (I/O). It further provides for energy efficient, high performance, and dense deployment of cloud service provider access network functions. The processors, accelerators, and NIC may be included in a system on chip (SoC) package.

A software-based abstraction of a L1 processor facilitates movement of network functions from one hardware construct to another. Line rate bulk encryption may be performed with Internet Protocol Security (IPsec), such as within the IPU, for hundreds of gigabytes of I/O in a SoC package to secure incoming and outgoing interfaces of cloud service provider access network functions.

The disclosure also provides for energy efficient machine learning inferencing acceleration for cloud service provider access network functions.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A converged system, comprising:
a plurality of processing units, comprising:
an infrastructure processing unit; and
a central processing unit coupled with the infrastructure processing unit via a programmable interconnect; and one or more peripheral components directly connected to the programmable interconnect and accessible by each of the plurality of processing units via the programmable interconnect;
wherein each of the plurality of processing units is configured to utilize the one or more peripheral components independent of other of the plurality of processing units.

2. The converged system of claim 1, wherein the one or more peripheral components comprise at least one of a network interface card (NIC) or an accelerator.

3. The converged system of claim 1, wherein the converged system is implemented in a system on chip (SoC).

4. The converged system of claim 1, further comprising at least one of a storage device or a machine learning accelerator, wherein the infrastructure processing unit and the central processing unit are adapted to access the at least one of storage device or machine learning accelerator.

5. The converged system of claim 4, wherein the at least one storage device or machine learning accelerator are directly coupled with the infrastructure processing unit.

6. The converged system of claim 5, wherein the at least one storage device or machine learning accelerator is accessible by the central processing unit via the infrastructure processing unit.

7. The converged system of claim 6, wherein the at least one storage device or machine learning accelerator are accessible via remote direct memory access.

8. The converged system of claim 1, further comprising a first root of trust coupled to the infrastructure processing unit and a second root of trust coupled to the central processing unit, the first root of trust being different from the second root of trust.

9. The converged system of claim 8, further comprising a peripheral component interconnect express (PCIe) switch coupled between the infrastructure processing unit and the central processing unit.

10. The converged system of claim 9, further comprising one or more accelerators directly connected to the PCIe switch, the one or more accelerators being accessible by each of the plurality of processing units.

11. The converged system of claim 1, wherein the central processing unit is directly coupled with a plurality of network interface cards (NICs) or accelerators.

12. The converged system of claim 1, wherein the central processing unit is an x-86-based central processing unit or an Arm-based central processing unit.

13. The converged system of claim 1, wherein the converged system is implemented on a server that is part of a cloud infrastructure.

14. The converged system of claim 13, wherein application processing workloads are executed on a first processing block while infrastructure applications are executed on the infrastructure processing unit.

15. A cloud infrastructure, comprising:
a plurality of servers,
wherein each of the plurality of servers comprises:
an infrastructure processing block; and
a central processing block coupled with the infrastructure processing block via a programmable interconnect; and
one or more peripheral components directly connected to the programmable interconnect and accessible by each of the infrastructure processing block and the central processing block via the programmable interconnect;

wherein each of the infrastructure processing block and the central processing block is configured to perform processing operations utilizing the one or more peripheral components independent of other processing block.

16. The cloud infrastructure of claim 15, wherein central processing block is configured to execute application processing workloads while the infrastructure processing block is configured to execute infrastructure applications.

17. A converged architecture, comprising:
a first configuration, comprising a central processing unit (CPU)-based architecture with an integrated first infrastructure processing unit (IPU) coupled to multiple peripheral component interconnect express (PCIe) devices via a programmable interconnect, the CPU, first IPU, and each of the multiple PCIe devices directly connected to the programmable interconnect; and
a second configuration, comprising a second infrastructure processing unit, without a central processing unit, connected to one or more PCIe devices;
wherein the first configuration is coupled to the second configuration.

18. The converged architecture of claim 17, wherein the programmable interconnect comprises a PCIe switch programmatically coupling the first configuration with the second configuration.

19. The converged architecture of claim 17, wherein the first configuration communicates with the second configuration using remote direct memory access.

20. The converged architecture of claim 17, wherein the PCIe devices comprise at least one of network interface cards (NICs) or machine learning accelerator devices.

* * * * *